United States Patent
Fang et al.

(10) Patent No.: US 7,389,013 B2
(45) Date of Patent: Jun. 17, 2008

(54) METHOD AND SYSTEM FOR VERTICAL OPTICAL COUPLING ON SEMICONDUCTOR SUBSTRATE

(75) Inventors: Ming Fang, Plano, TX (US); Larry R. Tullos, Flower Mound, TX (US); Hai Ding, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/955,891

(22) Filed: Sep. 30, 2004

(65) Prior Publication Data

US 2006/0067607 A1 Mar. 30, 2006

(51) Int. Cl.
*G02B 6/12* (2006.01)
*G02B 6/124* (2006.01)
*G02B 6/00* (2006.01)

(52) U.S. Cl. ............... 385/14; 385/15; 385/33
(58) Field of Classification Search .......... 385/14, 385/31, 47, 49
See application file for complete search history.

(56) References Cited

U.S. PATENT DOCUMENTS

| | | | |
|---|---|---|---|
| 4,163,953 A | 8/1979 | Springthorpe et al. . | 331/94.5 H |
| 4,989,934 A | 2/1991 | Zavracky et al. ........ | 350/96.11 |
| 5,195,150 A * | 3/1993 | Stegmueller et al. ......... | 385/33 |
| 5,392,368 A | 2/1995 | Schiltz ........................ | 385/14 |
| 5,600,741 A * | 2/1997 | Hauer et al. .................... | 385/35 |
| 6,066,511 A | 5/2000 | Fukusyo | |
| 6,115,521 A * | 9/2000 | Tran et al. ..................... | 385/52 |
| 6,188,094 B1 | 2/2001 | Kochi et al. | |
| 6,469,832 B2 | 10/2002 | Yotsuya et al. ............. | 359/619 |
| 6,527,455 B2 * | 3/2003 | Jian ............................. | 385/88 |
| 6,573,478 B2 | 6/2003 | Robinson et al. | |
| 6,626,585 B1 * | 9/2003 | Malone ........................ | 385/88 |
| 6,931,177 B2 * | 8/2005 | Suzuki et al. ................. | 385/33 |
| 6,932,516 B2 * | 8/2005 | Ouchi et al. .................. | 385/88 |
| 6,953,925 B2 | 10/2005 | Fang et al. | |
| 6,963,061 B2 * | 11/2005 | Richard et al. ........ | 250/227.14 |
| 2002/0025122 A1 * | 2/2002 | Ouchi et al. .................. | 385/88 |
| 2002/0054737 A1 | 5/2002 | Jian ............................. | 385/49 |
| 2002/0071636 A1 | 6/2002 | Bazylenko et al. ........... | 385/49 |
| 2003/0133682 A1 | 7/2003 | Temkin et al. .............. | 385/132 |
| 2003/0206679 A1 | 11/2003 | Murali ........................ | 385/14 |
| 2004/0023430 A1 * | 2/2004 | Gormley et al. .............. | 438/52 |
| 2004/0033029 A1 * | 2/2004 | Kondo ........................ | 385/88 |

(Continued)

FOREIGN PATENT DOCUMENTS

JP 60-225808 A * 11/1985

(Continued)

*Primary Examiner*—M. R. Connelly-Cushwa
(74) *Attorney, Agent, or Firm*—Lisa K. Jorgenson; David V. Carlson

(57) ABSTRACT

Connection between optical fibers and optical components within a semiconductor substrate. A lens is created at the front of a semiconductor substrate. A tapered hole is created in the back of the substrate exposing part or all of the surface of the lens. An optical component is formed or affixed at the front surface of the substrate. A volume of transparent adhesive is placed in the hole, followed by an optical fiber, which is thus coupled to the surface of the lens. A light guide is created on the front of the substrate overlying the lens to direct optical signals between the optical fiber inserted in the tapered hole and the optical component on the surface of the substrate.

25 Claims, 3 Drawing Sheets

U.S. PATENT DOCUMENTS

| | | |
|---|---|---|
| 2004/0070014 A1 | 4/2004 | Lin et al. |
| 2004/0202477 A1* | 10/2004 | Nagasaka et al. ........... 398/138 |
| 2004/0214368 A1 | 10/2004 | Rhodes |
| 2004/0264867 A1* | 12/2004 | Kondo ........................ 385/49 |
| 2005/0045927 A1 | 3/2005 | Li |
| 2006/0153334 A1 | 7/2006 | Monin et al. |

FOREIGN PATENT DOCUMENTS

JP 01-307707 A * 12/1989

* cited by examiner

METHOD AND SYSTEM FOR VERTICAL OPTICAL COUPLING ON SEMICONDUCTOR SUBSTRATE

BACKGROUND OF THE INVENTION

1. Field of the Invention

The present invention relates to fiber optic coupling and in particular to methods and devices for connecting optical fibers to optical components on semiconductor substrates.

2. Description of the Related Art

FIGS. 1A and 1B show a fiber optic coupling according to known art. A current solution for coupling optical fiber 104 to components on semiconductor substrate 102 involves etching a groove 106 in the semiconductor substrate 102, and aligning the fiber into the groove. A space 107 will exist under the fiber 104. The depth of the groove 106 is selected such that when the optical fiber is positioned in the groove 106, the core of the fiber 104 is correctly aligned with the optical component 108 on semiconductor substrate 102 as shown in FIG. 1B. However, the method described with reference to FIGS. 1A and 1B has at least one significant drawback.

The core diameter of the optical fiber is about 9 μm. The size of the groove needed for alignment is on the order of 12 μm. Accordingly, this method results in a significant use of available space on the surface of the substrate compared to the space used by other components. Additionally, in the event that the coupling involves a cluster of fibers, the total diameter is much greater, requiring a correspondingly larger groove, resulting in even more space occupied.

This integration process requires the alignment of multiple structures at different heights, which is difficult to control. Significant signal loss occurs unless the alignment is accurate and low yields result unless there is very high precision.

BRIEF SUMMARY OF THE INVENTION

According to principles of the present invention, a hole is formed in a semiconductor substrate that extends from the backside of the substrate. The hole extends towards the front side of the substrate. However, it does not go completely through the substrate but rather terminates in a lens which is positioned near a surface of the substrate. The hole is tapered in order to receive and align a fiber optic cable.

A transparent adhesive is placed inside the hole and then the fiber optic cable is inserted into the hole. The optic cable extends longitudinally from the backside of the substrate towards the front side.

Optical coupling between the fiber optic cable positioned in the hole and the lens in the front surface is provided by assuring correct alignment between the lens and the fiber optic cable. The position in the x-y plane can be accurately aligned using conventional semiconductor processing and masking techniques. The location in the z axis, from the back to the front of the substrate, is not required to be precise in order to achieve a good optical coupling. The structure is thus tolerant of some difference in location in the z axis and takes advantage of the high precision which is achievable in the x-y axis.

An optical component is formed above the lens in order to send or receive the signal via the fiber optic cable. The optical component is preferably the type which is compatible with semiconductor processing techniques. For example, the optical component may be an optical wave guide or a light channel formed of a transparent material on the surface of the substrate. The optical signal can therefore be transmitted to other locations on the same substrate and applied to the other optical components. For example, the signal may be applied to an optically sensitive diode or some other semiconductor component which converts the optical signal into electrical characteristics. Other semiconductor components may also be used, such as light switches, light modulation devices, optical couplers, optical pumps, amplification devices or any other optical component which may be used in an optical transmission or communication system.

The present invention provides the advantage that proper alignment between a lens and a fiber optic cable is assured by the structure and manufacturing technique. A further advantage is that the optical coupling can be mass produced with high reliability and precision. A further advantage is that the components can be made at an extremely low cost and much smaller size than was previously possible, thus further providing advantages of scale. The invention may be useful in optical communication systems as well as in optical based computers, data storage systems, and the like.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the prior art it is difficult to make a simple connection between an optical fiber and an optical component in a semiconductor substrate. The current invention provides a structure and technique to easily couple an optical fiber to devices in the substrate and simultaneously increase the signal received in the optical component and decrease the surface area of the substrate wasted in the current methods of connecting these devices.

Figure 1A:
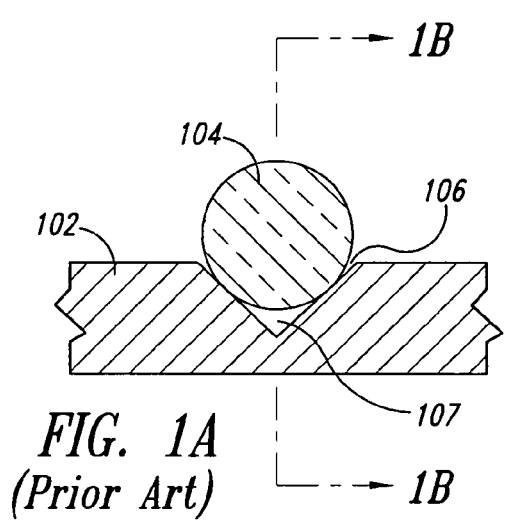
FIG. 1A is a cross-sectional view of a prior art structure.
Figure 1B:
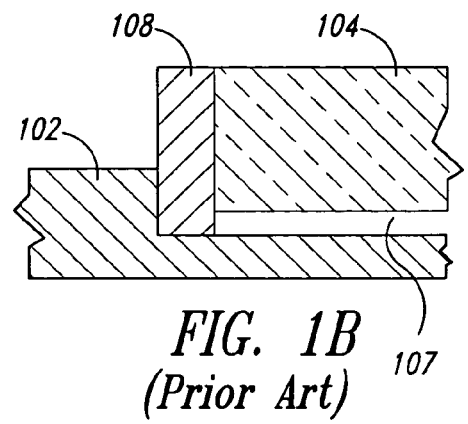
FIG. 1B is a cross-sectional view of the prior art structure of FIG. 1A taken on line 1B-1B.
Figure 2:
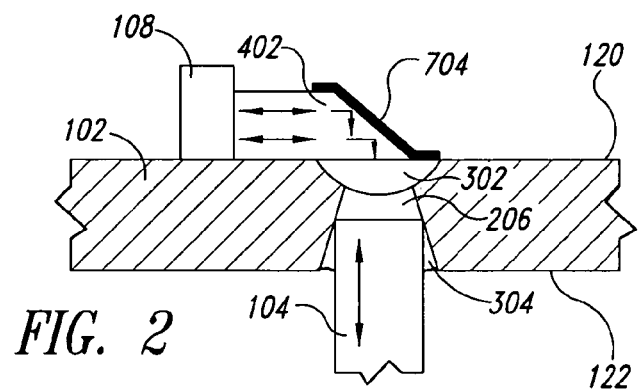
FIG. 2 is a cross-sectional view of one embodiment of the invention.
Figure 3:
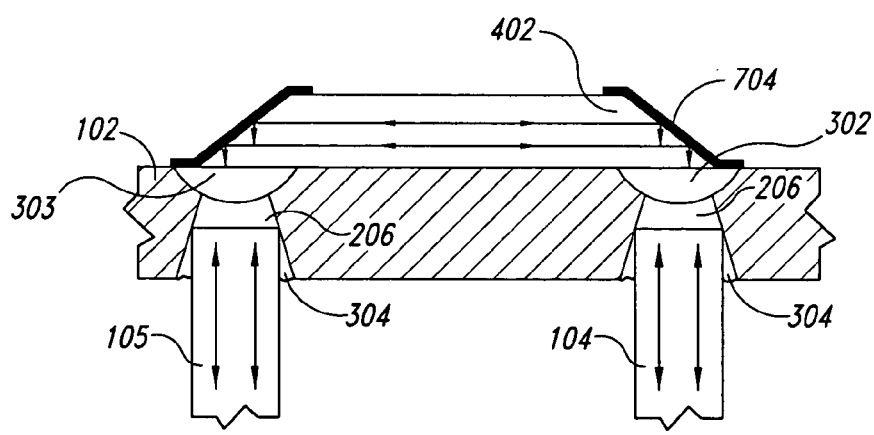
FIG. 3 is a cross-sectional view of a second embodiment of the invention.
Figure 4:
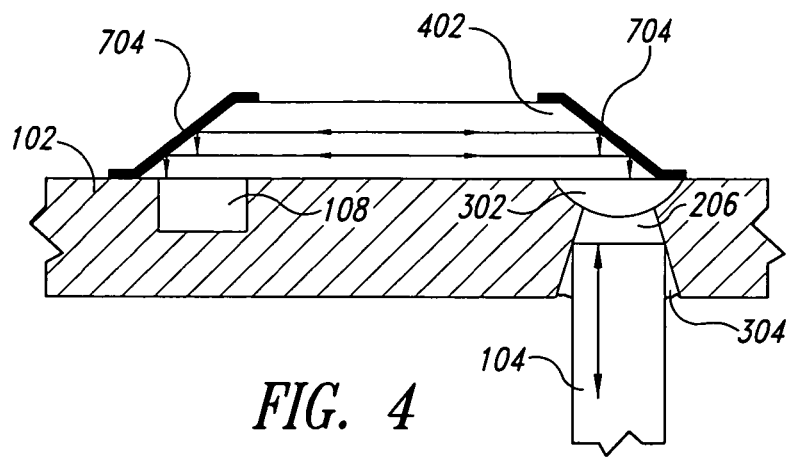
FIG. 4 is a cross-sectional view of a third embodiment of the invention.

FIG. 2 is a cross-sectional view of an embodiment of an optical connection incorporating the invention. A semiconductor substrate 102 is provided having an optical component 108 on the surface thereof. A lens 302 is positioned on the front surface region 120 of the semiconductor substrate 102. The optical component 108 and lens 302 may be in the semiconductor substrate as shown in FIGS. 3 and 4, the term "on" being used herein in the broad sense as meaning on top of, a part of, in, within and the like. The optical component 108 may be a light sensitive diode, an optical switch, a sensor or other optical component.

A hole 206 extends from the back surface 122 towards the front surface 120. The hole terminates on the surface of the lens 302 which has been formed in the front surface 120 of the semiconductor substrate 102. In some embodiments, it may be desirable for the hole 206 to extend completely through the semiconductor substrate. The hole 206 may be made slightly larger at its opening than the diameter of the optical fiber 104 and taper to become more narrow towards the lens 302, to have a diameter less than the optic fiber 104. In this way, the optical fiber 104 can be inserted into the hole 206 and ensure that it will be centered in the hole 206 and centered in alignment with the lens 302.

The figures are drawn for ease in illustrating the invention and not drawn to scale. For example, the substrate 102 will be many, many times thicker than the lens 302 and the various optical components 402, 108, 704 will have relative dimensions, sizes and shapes different from those shown.

A volume of transparent glue 304 is placed in the vertical hole 206 to couple the optical fiber 104 with the lens 302. The transparent glue 304 is applied in such a way that there are no voids in the glue. In a first embodiment, the adhesive 304 extends completely in the hole 206 spaced between the fiber 104 and the lens 302. In the first embodiment the fiber 104 is not allowed to come into contact with the lens 302 and is spaced from it. Depending on the structure selected for fiber 104 and lens 302, contact between the fiber 104 and lens 302 could damage the lens 302 and increase signal loss.

In this embodiment, the optical fiber 104 is positioned to be in firm contact with the sidewall of the tapered hole 206 with the adhesive completely filling a space between the lens 302 and the optical fiber 104. The material for the adhesive 304 is selected to have the appropriate optical properties to provide high quality optical coupling between the fiber 104 and the lens 302. Therefore, the signal is easily passed between the fiber and the lens with little or no loss. This also ensures that while the fiber 104 is in contact with the adhesive 304, it does not contact the lens 302. Similarly, the adhesive 304 is in contact with the lens 302 and is selected to be of a material that has good optical coupling and low loss at the boundary between the adhesive 304 and the lens 302. There are no voids or air pockets between the optical fiber 104 and the lens 302.

In an alternative embodiment, the adhesive 304, which is only around the edges of the optical fiber 104, is sufficient to retain the optical fiber 104 within the hole 206. In this alternative embodiment, an air gap, or other void present between the lens 302 and the end of the optical fiber 104 so that the signal transmits essentially through ambient air or, in some cases a vacuum, depending on the final manufacturing steps.

A light guide 402 is positioned adjacent the front surface 120 of the semiconductor substrate 102. The light guide 402 serves to transmit the optical signal from the lens 302 to the semiconductor component 108 positioned on the semiconductor substrate 102.

A reflective surface 704 is coupled to the light guide 402, directing optical signals from the lens 302 into a plane substantially parallel to the surface of the semiconductor substrate 102. The optical component 108 is located such that light from the light guide 402 will be incident thereon. The optical component 108 is one available in the art. For example, it may be any type of device which is capable of receiving, modifying, channeling, emitting or otherwise operating with optical signals. The optical component 108 is shown generically therefore to cover any of the many components which may be used in an optical communication system, digital computer, signal processing or other system.

In summary, the optical fiber 104 is positioned in an aperture that originates on the back side of the semiconductor substrate 102 and provides a signal through the semiconductor substrate to a lens member 302 positioned in a front side 120 of the semiconductor substrate to be carried in a light guide 402 positioned on the surface of semiconductor substrate 102 and therefore impinges upon the optical component 108.

In another embodiment, the optical component 108 emits light, which is carried by the light wave guide 402, then is reflected by the reflective surface 704, and incident on the receiving surface of the optical fiber 104.

FIG. 3 is a cross-sectional view of an embodiment of an optical connection incorporating the invention. Lenses 302 and 303 are positioned in the upper surface of the semiconductor substrate 102. Two tapered holes 206 are created in the semiconductor substrate, and two optical fibers 104, 105 are affixed into the tapered holes 206. A light guide 402 with two angled and reflective surfaces 704 is coupled between the lenses 302 and 303, directing light signals from the lens 302 into a plane substantially parallel to the surface of the semiconductor substrate 102 and reflected again into a plane substantially perpendicular to the semiconductor substrate 102 through lens 303 to the optical fiber 105. In this embodiment, optical signals can be transmitted from one optical fiber to another, in either direction. The light guide 402 may be a type of light switch or optical modulator that is controlled by electronics on the substrate. Electrical components, such as transistors, amplifiers, etc. are formed in the same substrate and can be used to control the optical signal. Thus, the optical components can be easily integrated into the same substrate as the electronic components using compatible processing techniques.

FIG. 4 is a cross-sectional view of an embodiment of an optical connection incorporating the invention. The lens 302 is positioned in the upper surface of the semiconductor substrate 102. A hole 206 is created in the semiconductor substrate, and an optical fiber 104 is affixed into the hole 206 perpendicularly to the substrate. An optical component 108 is positioned on the surface of the substrate 102. In this embodiment, the optical component 108 is actually within the substrate 102, but the term "on" as used herein includes such a position. A light guide 402 with two angled and reflective surfaces 704 is coupled to the lens 302, directing light signals from the lens 302 into a plane substantially parallel to the surface of the semiconductor substrate 102 and reflected again into a plane substantially perpendicular to the semiconductor substrate 102. In this embodiment, light emitting from one optical fiber 104 will be incident upon the optical component 108. Similarly, an optical signal emitting from or modified by the optical component 108 can be transmitted to the optical fiber 104.

Figure 5:
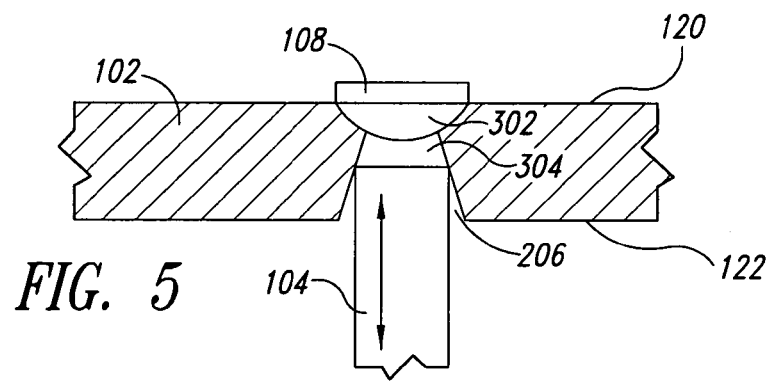
FIG. 5 is a cross-sectional view of a fourth embodiment of the invention.

FIG. 5 is a cross-sectional view of an alternative embodiment of an optical coupling incorporating the invention. In this embodiment, an optical component 108 is applied directly over a lens 302 in the front surface 120 of the substrate 102. A volume of transparent glue 304 is placed in a tapered vertical hole 206 in the lower surface of the substrate opposite the lens. An optical fiber 104 is inserted into the vertical hole until it contacts the tapered sidewalls of the hole 206, thus aligning the optical fiber 104 with the optical component 108.

Figure 7:
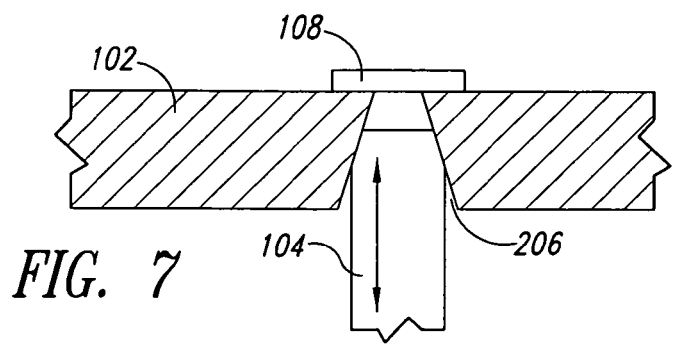
FIG. 7 is a cross-sectional view of a fifth embodiment of the invention.

In another embodiment the optical fiber 104 may be shaped to increase the efficiency of insertion into the hole 206, as shown in FIG. 7. For example, the end of the fiber may be conical in shape or have a rounded end to more easily fit within and be affixed to the substrate 102 inside hole 206.

A substantial advantage of the present invention is that it provides a structure and technique to easily connect an optical fiber to devices in the substrate. The connection is a low loss connection so that signals transferred along the optical fiber are passed to the component in the substrate with very low losses. A further advantage is that the surface area used in the semiconductor substrate is very small, thus providing a small footprint for the optical fiber to be coupled to the component in the semiconductor substrate. These provide significant advantages over current optical fiber connections.

Figure 6A:
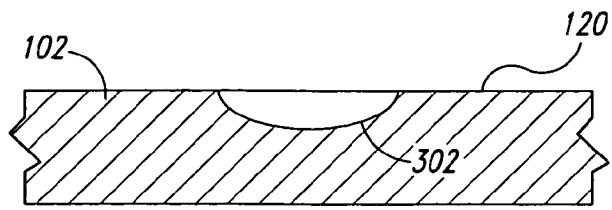
FIGS. 6A to 6E are cross-sectional diagrams showing steps in the manufacturing process according to the invention.

FIGS. 6A-6E illustrate a method by which the present invention may be manufactured. As shown in FIG. 6A, a semiconductor substrate 102 has a lens 302 formed in an upper surface 120 thereof. There are numerous acceptable techniques for forming a lens 302 in the upper surface of such a semiconductor substrate. For example, a mask layer may be formed above the semiconductor substrate 120 which is patterned and etched. A suitable etch, such as a wet etch or selective ion etching is used to form an aperture or hole in the semiconductor substrate 102 with the mask present. The mask is then removed and an optical material having desired optical properties is deposited in a blanket deposition over the entire surface 120 of the semiconductor substrate 102. This optical material can be any acceptable glass or other optical lens material that is compatible with the semiconductor process. For example, $SiO_2$, is a well known glass which is compatible for use in the semiconductor process. Other choices for the material for the lens 302 include a spin-on glass, such as a flowable dielectric, a TEOS layer, or other optical materials. After the optical material is positioned inside the aperture, the material may be planarized by any acceptable technique, such as CMP, reactive ion etching and the like. Such a technique will create a lens 302 having an upper surface planar with the upper surface 120 of the semiconductor substrate 102. One acceptable technique is described in detail in co-pending U.S. Application Attorney Docket No. 850063.604, filed concurrently herewith and commonly assigned.

Figure 6B:
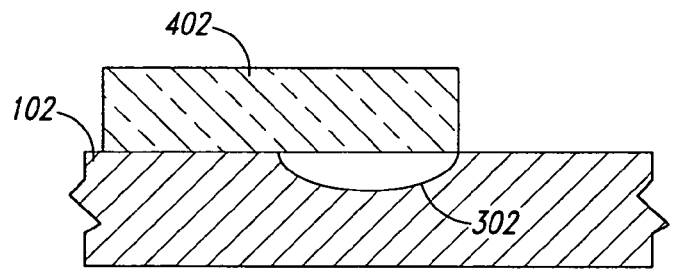

After the lens 302 is formed, a blanket deposition of a layer 402 having good optical properties is deposited on the semiconductor substrate 102. This layer 402 is then patterned and etched to be aligned with the lens 302 in a position as shown in FIG. 6B. Of course, depending on the design the optical material 402 may be centered over the lens 302 or be in other positions relative to the lens 302 depending on the end product being designed. Alternatively, the material 402 is not present and the optical component 108 may be formed directly on top of, and in contact with the lens 302, as shown in FIG. 5.

The material 402 is any acceptable light guide material for optical signals. A TEOS layer composed of clear glass has been found to be an acceptable light guide for use within the present invention. Other materials may be used, such as silicon dioxide, a spin-on glass, a flowable dielectric, or other materials compatible with the semiconductor process. A sequence of steps may also be carried out prior to the deposition of the layer 402 in order to form the optical component 108. The formation of optical components 108 on or within a semiconductor substrate is well known in the art. The formation of such optical components is carried out in a sequence relative to the formation of the optical layer 402 so that the components are positioned as desired according to the design of the final end product.

Figure 6C:
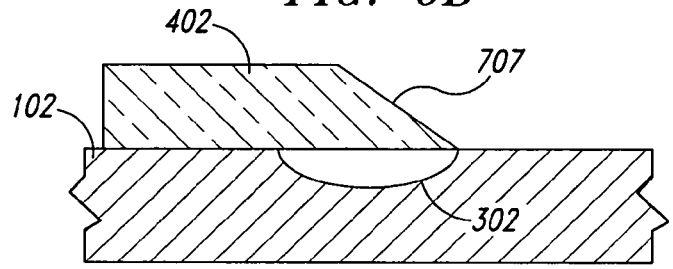

As shown in FIG. 6C, the light guide material 402 is then etched with an appropriate tapered edge in order to create an angle for the reflection of light. The angle selected will be based upon the desired direction that optical signals are to be transmitted along the wave guide. While one preferred embodiment is a 45° angle for the etch, other embodiments may be used, such as a 60°, 30° or other angles in order to direct the light into the optical component 108 depending on its position and location. Various etches in order to achieve the tapered surface 707 are well known in the art and will not be described in detail herein and any of the many techniques for forming such a tapered edge may be selected from those available in the art.

Figure 6D:
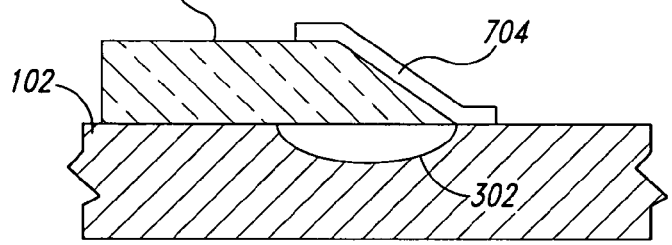

FIG. 6D illustrates the application of a reflective layer 704 similar to that shown in FIG. 2. The reflective material 704 may be selected from any of the many reflective materials available in the art and compatible with the semiconductor process. Aluminum is one acceptable material as it creates a highly mirrored reflective surface. Other acceptable materials include such metals as tungsten, titanium and the like. Numerous other materials are available for use as the reflective coating 704 direct the light along the wave guide 402.

Figure 6E:
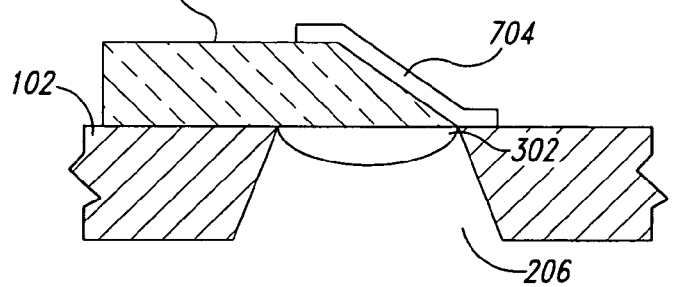

FIG. 6E illustrates the formation of a hole 206 in the semiconductor substrate 102, not to scale, as previously stated. The hole 206 will generally be formed by placing a masking layer over the back side of the semiconductor substrate 102, patterning exposing and etching the mask so as to provide an aperture positioned over the back surface of the semiconductor substrate 102 at a desired location. After the exposure of the aperture, the semiconductor substrate 102 is etched in a desired pattern. Reactive ion etchings are known that produce a sloped vertical sidewall similar to that shown in FIG. 6E using etch properties and controls well known to those of skill in the art. The shape of the hole 206 can be selected and determined as desired for the design and for the later affixing of the optical fiber 104 using many of the etching techniques available in the art. While the hole 206 is shown as a vertical hole with slightly tapered sides, it will be understood that other shapes may be used, for example, the hole 206 may have a conical, funnel or other shape. The etching of these various shapes for hole 206 are well known to those of skill in the art in forming apertures in semiconductor substrates and the details therefore are not described herein.

When the hole 206 is etched, a technique is used for which the lens 302 is an etch stop. For example, if silicon dioxide is used for the lens 302, there are numerous etches well known in the art today which have a high selectivity to etch silicon but which stop etching on silicon dioxide. Thus, an etch which is highly selective for etching silicon over silicon dioxide is used. Similar selective etching techniques will be used depending on the material used for the lens 302. For example, selective etches are well known for other layers which may be used for the lens 302 as compared to silicon. TEOS, spin on glass, flowable dielectrics and other materials which may be used for the lens 302 can all be easily selectively etched or act as an etch stop with respect to a silicon etch.

Following the formation of the hole 206, an optical fiber 104 is positioned in the hole 206 similar to that shown in FIG. 2. Thus, the structure of FIG. 2 can be constructed. As will be appreciated, the steps may be done in a somewhat different sequence and still fall within the concept of the present invention to achieve the final product as shown in FIGS. 2-5.

All of the above U.S. patents, U.S. patent application publications, U.S. patent applications, foreign patents, foreign patent applications and non-patent publications referred to in this specification is incorporated herein by reference, in its entirety.

From the foregoing it will be appreciated that, although specific embodiments of the invention have been described herein for purposes of illustration, various modifications may be made without deviating from the spirit and scope of the invention. For example, one skilled in the art will recognize that the invention can be applied to other materials than semiconductor substrate, such as a silicon substrate; or that the optical fibers may be grouped instead of being applied singly. One skilled in the art will also recognize that the methods and systems discussed herein are applicable to differing applications such as audio or visual communications devices, data transfer equipment, or to read optical data storage devices.

The invention claimed is:

1. A method for coupling an optical fiber to an optical component comprising:
   forming a hole in a semiconductor substrate extending from a first side of the substrate towards a second side thereof, the hole having a first diameter at the first side of the substrate and tapering to a second, smaller diameter;
   forming a cavity in the second side of the substrate;
   forming a lens by depositing an optical material in the cavity that conforms to a shape of the cavity; and
   affixing an optical fiber within the hole such that light from the optical fiber is incident on the lens, the optical fiber having a third diameter, greater than the second diameter and less than the first diameter.

2. The method of claim 1, further comprising:
   depositing a layer of material on the second side of the semiconductor substrate; and
   forming, after depositing the layer of material, an optical component in the layer of material in a position such that light from the optical fiber is incident on the optical component, via the lens.

3. The method of claim 2 wherein the optical component is configured to receive light from the optical fiber and transmit the light to an additional optical component.

4. The method according to claim 3 wherein the additional optical component is a light guide.

5. The method according to claim 2 wherein the optical component is a mirror, positioned to direct light from the optical fiber to a receiving component.

6. The method according to claim 5 wherein the step of forming the optical component comprises:
   depositing a TEOS layer on the second side of the substrate;
   planarizing one portion of the TEOS layer at a selected angle; and
   depositing a reflective layer on at least the planarized portion of the TEOS layer.

7. The method according to claim 2 wherein the optical component includes first and second mirrored surfaces, the first mirrored surface configured to reflect light from the optical fiber into a plane substantially parallel to the second side of the substrate, the second mirrored surface configured to reflect light from the first mirrored surface to an additional optical component formed on the substrate.

8. The method according to claim 1 wherein the step of forming the hole comprises etching the hole from the first side toward the second side, and wherein the etch is formulated to be highly selective between the material of the semiconductor substrate and the optical material, such that the lens acts as an etch stop when the hole reaches the lens.

9. The method according to claim 1 wherein the lens has a planar upper surface, the upper surface of the lens being substantially parallel to the second side of the substrate.

10. A device for coupling an optical fiber, comprising:
    a semiconductor substrate;
    a hole in the semiconductor substrate penetrating from a first surface of the substrate toward a second surface thereof, and configured to receive an optical fiber therein;
    a cavity formed in the second surface of the substrate;
    a lens formed in the cavity of a material different from the substrate and having a portion thereof in contact with and conforming to a surface of the substrate within the cavity; and
    an optical component formed directly on the second surface of the semiconductor substrate and overlaying the lens such that light from the optical fiber is incident on the optical component via the lens.

11. The device of claim 10 wherein the hole is tapered towards the second surface and configured to align the optical fiber with the optical component.

12. The device of claim 10, further including a volume of transparent glue positioned within the hole and configured to mechanically and optically couple the optical fiber to the optical component.

13. The device according to claim 10 wherein the optical component is a mirror positioned to direct light from the optical fiber to a receiving component.

14. The device according to claim 10 wherein the optical component has first and second mirrored surfaces, the first mirrored surface configured to reflect light from the optical fiber into a plane substantially parallel to the second surface of the substrate, the second mirrored surface configured to reflecting light from the first mirrored surface to an additional optical component.

15. The device according to claim 10, further comprising:
    an additional hole formed in the semiconductor substrate penetrating from the first surface of the substrate toward the second surface and configured to receive an additional optical fiber therein, the additional hole positioned such that light reflected from the second mirrored surface is incident on the additional optical fiber.

16. The device according to claim 10, further including:
    a plurality of electronic components formed in the semiconductor substrate.

17. The device according to claim 16 wherein one of the plurality of electronic components is a MOS transistor.

18. A device comprising:
    a substrate of semiconductor material, having first and second surfaces lying substantially parallel to each other;
    a cavity formed in a first surface of the substrate;
    a lens formed in the cavity, of an optical material different from the material of the substrate, a shape of the cavity at least partially defining a shape of the lens; and
    a hole formed in a second surface of the substrate opposite a position of the lens, the hole extending from the second surface to a surface of the lens.

19. The device of claim 18, further comprising an optical component positioned adjacent the lens on a side opposite the hole.

20. The device of claim 19 wherein the optical component is a mirror.

21. The device of claim 20 wherein the mirror is formed on the surface of the substrate of semiconductor material.

22. The device of claim 21, further comprising an optical fiber, an end of which is positioned within the hole so as to be optically coupled with the lens, the optical fiber having a third diameter greater than the second diameter and less than the first diameter.

23. The device of claim 19 wherein the hole is tapered from a first diameter at the second surface of the substrate to a second, smaller diameter toward the first surface.

24. The device of claim 18, further comprising an optical fiber, an end of which is positioned within the hole so as to be optically coupled with the lens.

25. The device of claim 18 wherein a surface of the lens is in contact with and conforms to a surface of the substrate within the cavity.

* * * * *